United States Patent [19]
Pugh

[11] 4,449,413
[45] May 22, 1984

[54] EXTENSOMETERS

[75] Inventor: Harold Pugh, Warrington, England

[73] Assignee: United Kingdom Atomic Energy Authority, London, England

[21] Appl. No.: 402,573

[22] Filed: Jul. 28, 1982

[30] Foreign Application Priority Data

Aug. 14, 1981 [GB] United Kingdom ............... 8124945

[51] Int. Cl.³ .............................................. G01B 7/22
[52] U.S. Cl. ................................................. 73/780
[58] Field of Search ........................... 73/780, 775, 786

[56] References Cited

U.S. PATENT DOCUMENTS

| | | | |
|---|---|---|---|
| 4,054,049 | 10/1977 | Egger | 73/780 |
| 4,197,753 | 4/1980 | Harting et al. | 73/780 |
| 4,236,109 | 11/1980 | Ingle | 73/780 |

*Primary Examiner*—Anthony V. Ciarlante
*Attorney, Agent, or Firm*—William R. Hinds

[57] ABSTRACT

An electrical capacitance extensometer comprising capacitance surfaces formed on metal sheathed mineral insulated cables and an earthed capacitance modulating member adapted to be displaced relative to the capacitance surfaces in response to strain in a workpiece. The extensometer is encapsulated in a stainless steel envelope to adapt it for use submerged in liquid metal.

4 Claims, 7 Drawing Figures

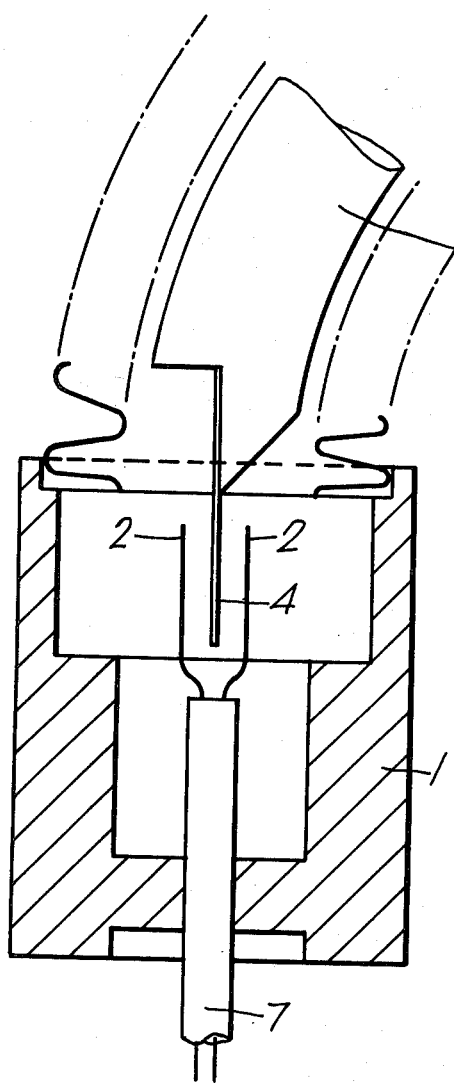
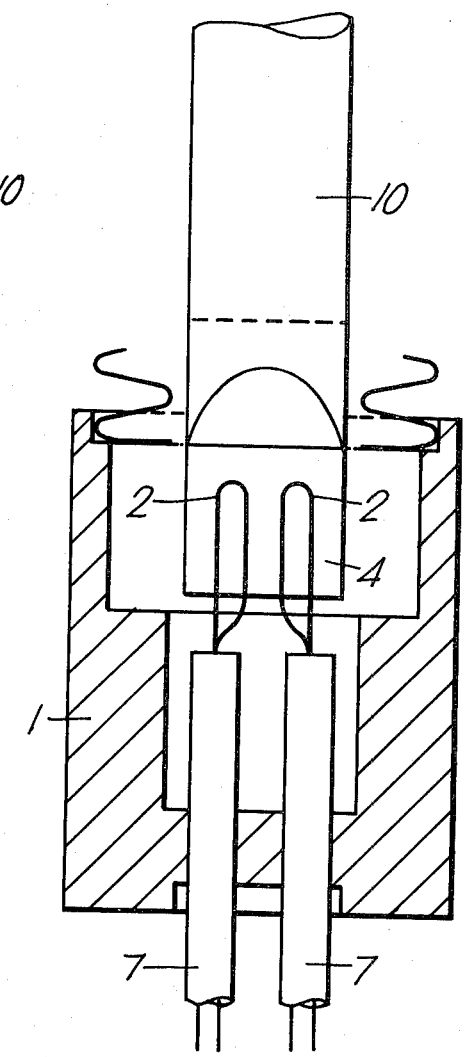

EXTENSOMETERS

BACKGROUND OF THE INVENTION

This invention relates to extensometers.

Extensometers wherein a change in electrical capacitance due to displacement of a member is related to extension are known. Typically, in such an instrument the capacitance surfaces comprise relatively displaceable plates and in a hostile environment there can be difficulty in providing flexible electrical connections which can accommodate the movement. Extensometers which make the use of variable electrical capacitance are hereinafter referred to as extensometers of the capacitance kind and an object of the invention is to provide an extensometer of the capacitance kind which is sufficiently robust to be capable of operation for long periods without maintenance in a high temperature and hostile environment.

SUMMARY OF THE INVENTION

According to the invention in an extensometer of the capacitance kind the capacitance surfaces are relatively static and there is an earthed capacitance modulating member which is adapted for displacement relative to the capacitance surfaces in response to strain of a workpiece. Static capacitance surfaces enable use of rigid electrical connections such as those consisting of metal sheathed mineral insulated cables which are better able to withstand a hostile environment.

Conveniently the capacitance surfaces can comprise prepared end regions of metal sheathed mineral insulated cables.

In a preferred extensometer of the capacitance kind according to the invention, the capacitance surfaces and the modulating member are sealably enclosed within a flexible envelope so that the extensometer is suitable for operation submerged in a liquid alkali metal coolant of a nuclear reactor construction.

In a construction of extensometer according to the invention the capacitance surfaces may be defined by opposed flat faces formed on severed end regions of the sheaths of metal sheathed mineral insulated cables.

In an alternative construction the capacitance surfaces may consist in conducting cores extending beyond the ends of the sheath and insulation of metal sheathed mineral insulated cable.

DESCRIPTION OF THE DRAWINGS

Constructions of extensometer embodying the invention are described by way of example, with reference to the accompanying drawings wherein:

FIG. 4 is a fragmentary sectional side view of a secondary construction,

FIG. 5 is a fragmentary sectional end view of the second construction,

DESCRIPTION OF THE PREFERRED EMBODIMENT(s)

Figure 1:
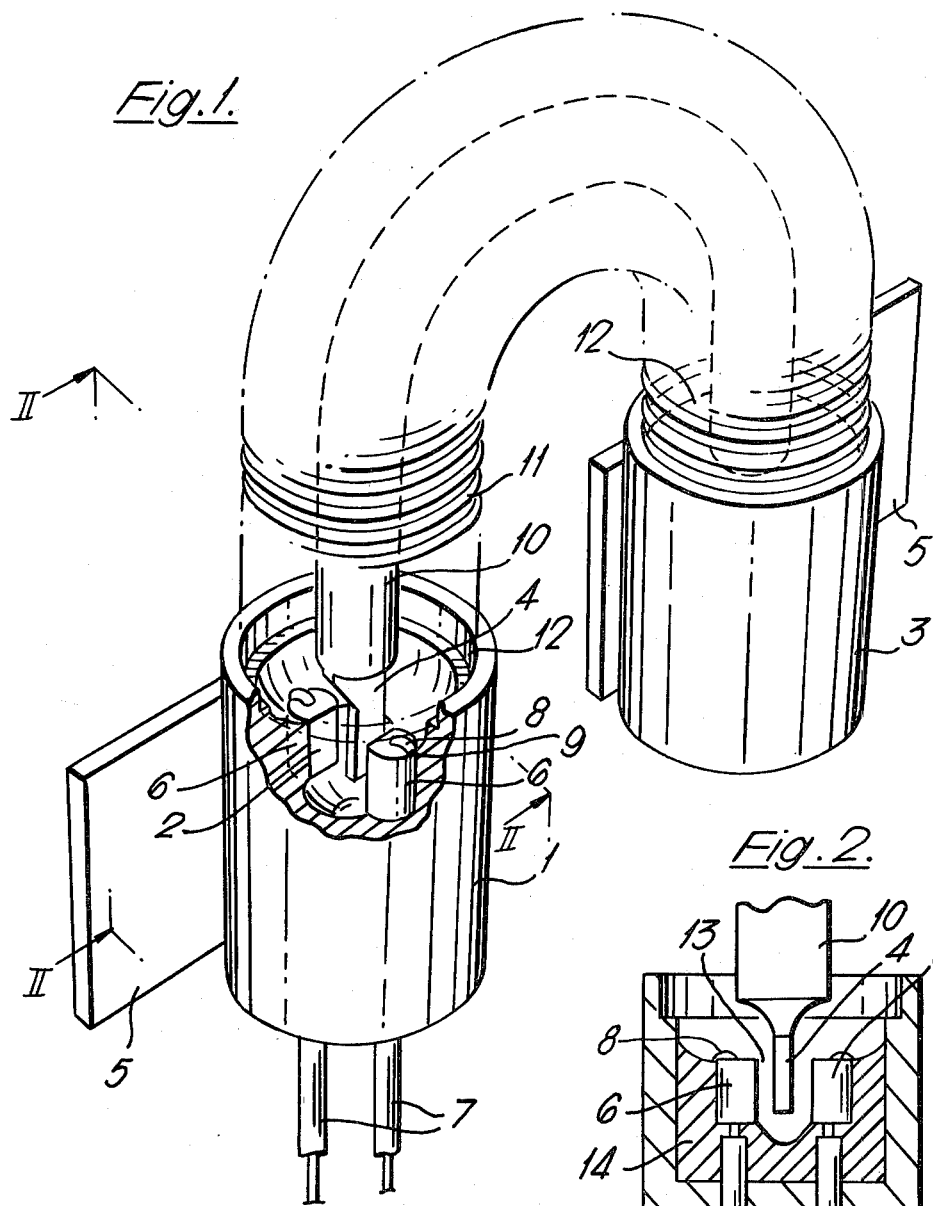
FIG. 1 is a view in perspective of a first construction.
Figure 2:
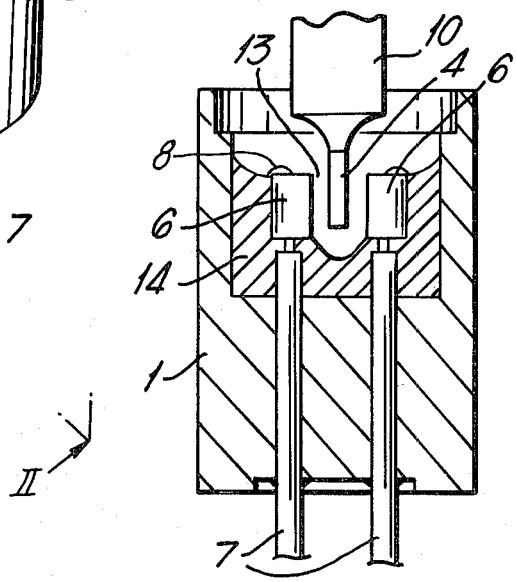
FIG. 2 is a sectional view in the plane II—II of FIG. 1.
Figure 3:
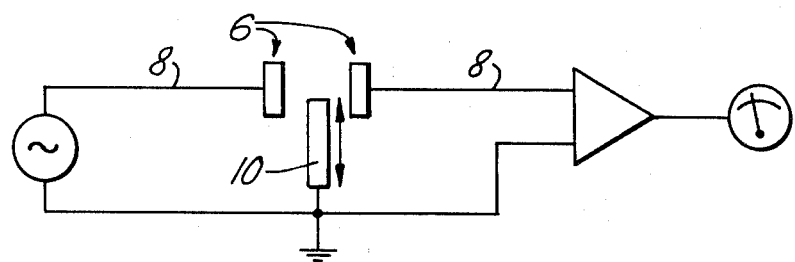
FIG. 3 is a capacitance diagram.

The extensometer illustrated by FIGS. 1, 2 and 3 comprises a capacitance head 1 carrying a pair of static capacitance surfaces 2 and a modulating head 3 which carries an earthed capacitance modulating member 10 having a blade end 4 disposed between the capacitance surfaces. The heads have brackets 5 which provide anchor points for attachment of the heads to structure. The capacitance surfaces comprise prepared end regions of metal sheathed mineral insulated cables and are defined by opposed flat faces formed on severed end regions 6 of the sheaths of the cables as shown in FIG. 2, the ends of the single cores 8 of the cables being welded at 9 to their respective severed end regions of the sheaths. The modulating member 10 comprises an arcuate arm having the blade 4 formed at a free end whilst the other end is secured in earthing manner to the head by Nicrobraz (Registered Trade Mark). The modulating member 10 and the capacitance surfaces are sealably enclosed within a flexible envelope 11 of convoluted stainless steel tubing, the ends of the envelope being received in counterbores 12 in the heads and secured by Nicrobraz or electron beam welding.

As shown in FIG. 2 the ends of the mineral insulated cables 7 penetrate one end of the head 1 and are received in a counterbore 13. The sheaths are secured by Nicrobraz and the severed end regions of the sheaths are secured in the counterbore 13 by vitreous enamel 14 which is fired during assembly of the instrument at 850° C.

In use the instrument is attached by welding of the brackets 5 to structure in such a manner that strain in the structure causes displacement of the modulating blade 4 relative to the capacitance surfaces 2 thereby effecting a change in capacitance. The envelope enables the instrument to operate at high temperature in a hostile environment such as, for example, the liquid alkali metal coolant of a nuclear reactor, the convoluted tube serving to exclude coolant and as a thermal screen to reduce the sensitivity of the instrument to temperature transients.

Figure 6:
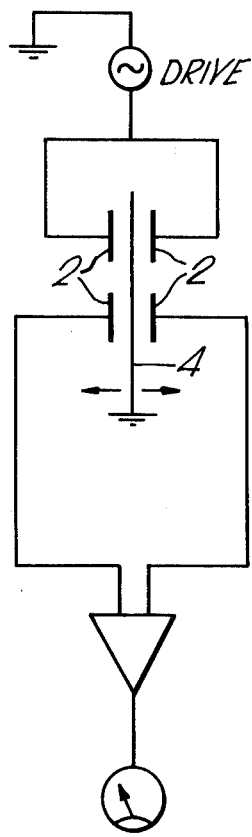
FIG. 6 is a capacitance diagram.

The second construction of extensometer shown in FIGS. 4, 5 and 6 is generally similar to the first construction, differing only in the capacitance head 1 and the blade end 4 of the modulating member. The two metal sheathed mineral insulated cables 7 received in the capacitance head 1 each have two conductor cores and the ends of the cables are prepared to provide capacitance surfaces 2 by baring the ends of the conductor cores, forming the ends into elongate loops as shown in FIGS. 4 and 5 arranging the loops so that they upstand in spaced, parallel pairs whereby the blade end 4 of the modulating member 10 can lie between the loops of each cable. The modulating member 10 comprises an arcuate arm of stainless steel similar to that of the first described construction but having a stainless steel blade directed transversely of the longitudinal arm and secured by welding in a step formed at the free end of the member.

In use the instrument is secured to the structure to be monitored and the loops of one cable 7 are connected in parallel to an oscillator whilst the loops of the second cable are connected through a differential amplifier to a voltmeter. The blade 4 provides capacitance couplings between corresponding loops of each cable the capacitance being variable by displacement of the blade relative to the pairs of loops.

The described extensometers are generally suitable for use in a hostile environment but they find particular use in a liquid metal cooled nuclear reactor construction for detecting strain in a structure which is submerged in liquid alkali metal such as sodium at temperatures varying between 400° C. and 600° C. The extensometers are intended primarily to be attached to a flat surface of the structure to be monitored but in conditions where the surface is curved the second construction of extensometer is most suitable because deflection of the modulating blade due to the curvature is in a direction parallel to the capacitance surfaces thereby having little effect on the output signal whereas as with the first-described construction the deflection is towards one of the capacitance surfaces thereby affecting a significant change in capacitance and possible damage to the blades.

Figure 7:
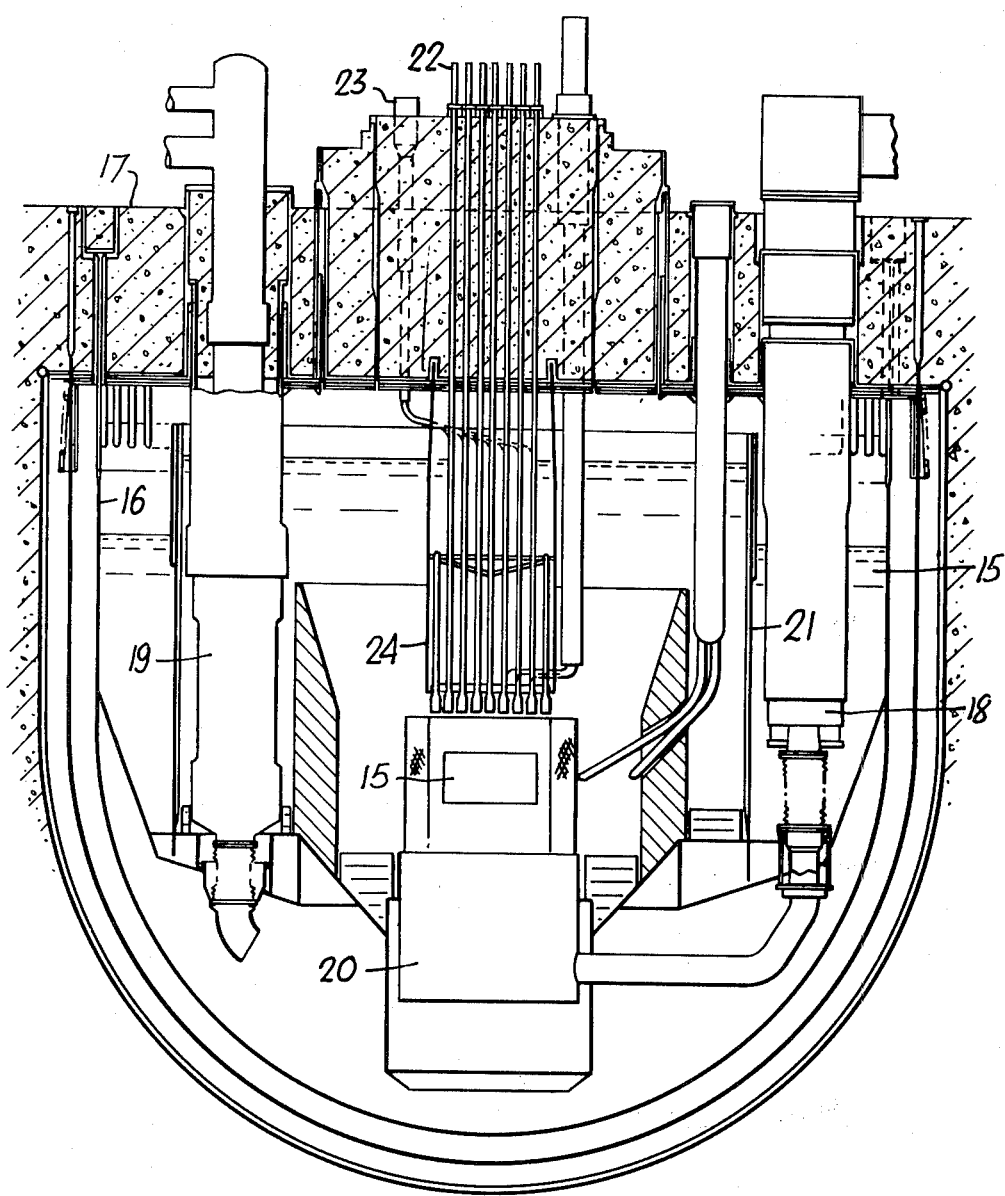
FIG. 7 is a sectional view of a liquid metal cooled nuclear reactor construction.

The nuclear reactor construction shown in FIG. 7 comprises a fuel assembly 15 submerged in a pool of liquid sodium coolant in a primary vessel 16. The primary vessel is suspended from the roof of a containment vault 17 and there is provided a plurality of coolant pumps 18 and heat exchangers 19 only one each of the pumps and heat exchangers being shown. The fuel assembly 15 mounted on a structure 20 is housed with the heat exchangers in a core tank 21 whilst the pumps 18, which deliver coolant to the structure 20, are disposed outside of the core tank. The core or fuel assembly 15 comprises a plurality of fuel sub-assemblies which upstand from the structure 20 in closely-spaced side-by-side array. Control rods 22 and instrumentation 23 penetrate the roof of the vault and extend to the fuel assembly by way of above core structure 24 carried by the roof.

In operation of the nuclear reactor, coolant is flowed from the pumps 18 to the fuel assembly by way of the structure 20 which distributes the coolant flow throughout the fuel assembly. Flow is upwardly through the fuel assembly in heat exchanger therewith, thence from the upper region of the core tank 21 back to the outer region of the pool by way of the heat exchangers 19. Extensometers according to the invention are attached to the support structure 20 for the fuel assembly and to above core structure 24 so that strain therein can be monitored.

I claim:

1. An extensometer of the electrical capacitance kind comprising, static complementary capacitance surfaces, and a capacitance modulating member disposed between the capacitance surfaces so that the modulating member is adapted for displacement relative to the capacitance surfaces in response to strain of a workpiece, characterized in that the modulating member is of arcuate form between its ends, and the extensometer is encapsulated in a flexible envelope of corresponding arcuate form.

2. An extensometer as claimed in claim 1 in which connections are made to the extensometer by mineral insulated cables having an outer sheath and an inner conductor, with the inner conductors exposed to form structural parts of said static complementary compacitance surfaces.

3. An extensometer as claimed in claim 1 wherein the arcuate modulating member comprises an elongate arcuate arm fixed at one end and having a free end disposed between said static capacitance surfaces for displacement relative thereto in response to strain of a workpiece.

4. An extensometer as claimed in claim 3 comprising a modulating head and a capacitance head for attachment to a workpiece, said fixed end of said arcuate arm being fixed to said modulating head, said static capacitance surfaces being fixed to said capacitance head, said arcuate arm extending arcuately from said modulating head to said capacitance head with its free end disposed between said static capacitance surfaces, and said arcuate envelope comprising an arcuate tube of convoluted metal sealed at its ends to said capacitance head and said modulating head and encapsulating said arcuate arm and said capacitance surfaces with clearance.

* * * * *